United States Patent [19]

Townsend

[11] Patent Number: 4,466,652

[45] Date of Patent: Aug. 21, 1984

[54] CARRIER APPARATUS

[76] Inventor: Montie M. Townsend, 6206 Gainsborough, Amarillo, Tex. 79106

[21] Appl. No.: 261,104

[22] PCT Filed: Dec. 23, 1980

[86] PCT No.: PCT/US80/01762

§ 371 Date: Dec. 23, 1980

§ 102(e) Date: Dec. 23, 1980

[87] PCT Pub. No.: WO82/02189

PCT Pub. Date: Jul. 8, 1982

[51] Int. Cl.³ .......................... A47G 25/06; B65G 7/12
[52] U.S. Cl. ...................................... 294/142; 294/137
[58] Field of Search ...................... 294/25, 26, 137, 15, 294/141-143, 145, 149, 153, 158, 159, 164, 167, 171; 16/114 R, 125, 127; 190/57, 58 R, 58 A, 58 B, 58 C; 206/278, 279, 284-289

[56] References Cited

U.S. PATENT DOCUMENTS

| | | | |
|---|---|---|---|
| 587,634 | 8/1897 | Archbold | 294/137 |
| 901,057 | 10/1908 | Autenrieth | 294/26 |
| 2,782,974 | 2/1957 | Borgfeldt | 294/159 |
| 3,162,473 | 12/1964 | George | 294/15 X |
| 3,226,147 | 12/1965 | Marshall | 294/15 X |
| 3,313,460 | 4/1967 | Hooker | 294/159 |
| 3,578,226 | 5/1971 | Good | 294/137 |
| 3,606,967 | 9/1971 | Roberts | 294/143 |
| 4,091,976 | 5/1978 | Morse | 294/142 |

Primary Examiner—Johnny D. Cherry
Attorney, Agent, or Firm—Ely Silverman

[57] ABSTRACT

A carrier apparatus comprises a first larger rigid loop, a second or smaller rigid ring and a straight rigid bar. The rigid loop extends along a first plane and has a maximum diameter of about 3 inches and a minimum diameter of about 2 inches. The smaller rigid ring has an outside diameter of about 1 inch and extends in a second plane transverse to the first plane. The loop and ring have a common axis of symmetry. The rigid straight smooth surface bar extends about 4 inches transversely to the axis of symmetry and along the second plane and is rigidly joined to the loop and ring. The carrier apparatus cooperates with the structure of the human hand to provide means for loading, transporting and unloading a load of clothes comfortably and efficiently.

13 Claims, 30 Drawing Figures

CARRIER APPARATUS

DESCRIPTION

1. Technical Field

The invention relates to apparatus for carrying a load of garments or the like supported on hangers. In the carrying of a load of clothes or the like by hand and movement of such loads to and from a support therefor there are an intense and uncomfortable stresses on the fingers of the hand and on the arm. Such stresses limit the amount and comfort of carrying and manipulation of such loads.

2. Background Art

Holders for garments which garments are supported on hangers therefor do not provide for such adaptation to the human hand as to permit comfortable carriage and manipulation of a group of garments supported on conventional hangers therefor.

DISCLOSURE OF THE INVENTION

A rigid structure comprising a first relatively small rigid ring extending in a first plane and a rigid, larger, loop extending in a second plane perpendicular to the first plane with a common axis of symmetry and a rigid straight bar extending perpendicular to that axis are joined together with the bar extending in the plane of the small ring and adjacent that junction of the ring and the loop. The structure of this invention provides that the large loop extends through the interdigital spaces of an operator's clenched fist while the smaller ring is located within the cavity between the fingers and palm of the operator's clenched hand. The area of contact of the bar of the apparatus and the palm of the operator's hand extends the full width of the palm and so applies the entire strength of the hand and both arms of the operator to control the load carried by the loop and permits a load of clothes to be not only comfortably carried by the operator but also that the load and the apparatus be positively reliably and comfortably moved to and from the position at which the load may be transferred from and to a support for such load.

BRIEF DESCRIPTION OF THE DRAWINGS

FIG. 10 shows an operator 51 carrying load 90. FIG. 11 shows the operator in a stage of moving the load from his back to the left of his left shoulder. FIG. 12 shows the operator in a stage of moving the load 90 forward and to the right while that load is supported by the apparatus 31. FIG. 13 shows the operator 51 in a stage of moving the load 90 forwardly to a rack on which it is subsequently supported.

FIG. 17 shows an operator 51 carrying a load 40.

FIG. 18 shows the operator in the stage of moving the load 90 from his back to the right of his right shoulder.

FIG. 19 shows the operator in the stage of moving the load 90 forward and to the left while that load is supported by the apparatus 31.

FIG. 20 shows the operator in the stage of moving the load 90 forwardly to a rack on which it is subsequently supported.

BEST MODE FOR CARRYING OUT THE INVENTION

The carrier apparatus 31 comprises a top rigid ring 32, an intermediate rigid bar 33 and a lower rigid loop 34. The ring is rigid and generally circular and, at its lower portion, is firmly joined at a bar-ring junction 35 to the middle of the bar 33. The upper portion of the loop 34 is firmly joined to the bottom of the bar 33 at a loop-bar junction 36. That loop-bar junction is located immediately below the bar-ring junction 35 and both junctions 35 and 36 are located half way between the left end 44 and the right end 45 of the bar 33. The bar 33 is straight from its left end 44 to its right end. As shown in the position of parts in FIGS. 1, 2 and 4 a vertical axis 41 passes diametrically through the center of the ring 32 and forms an axis of symmetry for the portions of the lower rigid loop 34.

Generally the portions of the upper circular ring 32 lie in a flat plane 42 and the portions of the lower rigid loop 34 lie in a flat plate 43. More particularly, ring 32 has the shape of an anchor ring, the solid portion of which is circular in transverse cross section as shown in cross sectional view in FIG. 3. A flat central ring plane 42 passes diametrically through all the solid circular portions of ring 32 and bisects such portions, as shown in FIG. 3.

Figure 2:
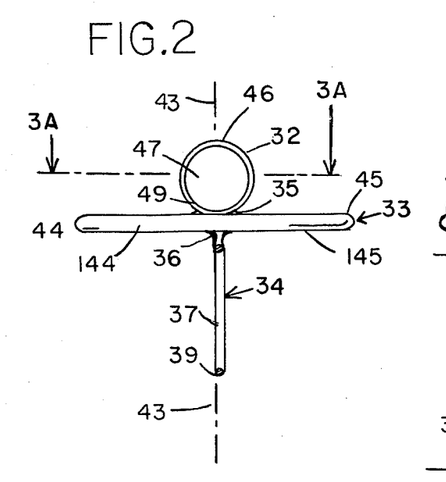
FIG. 2 is an end and partly sectional view of apparatus 31 along the direction of arrow 2A of FIG. 1 and plane 2B—2B of FIG. 3.
Figure 3:
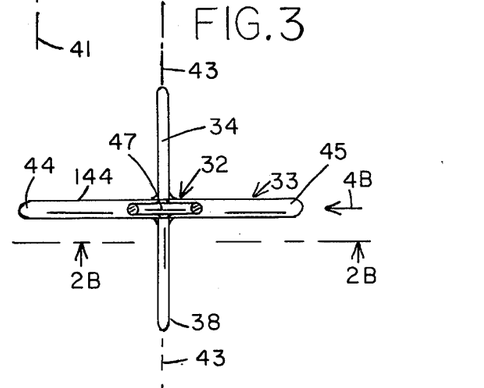
FIG. 3 is a top and sectional view of apparatus 31 along the section 3A—3A of FIG. 2.

All portions of the curved rigid loop 34 are circular in transverse cross section, as shown in FIG. 2 for the particular section 2B—2B of FIG. 3. A flat central loop plane 43 passes diametrically through all the circular portions of loop 34 and bisects such portions, as shown in FIG. 2.

Figure 1:
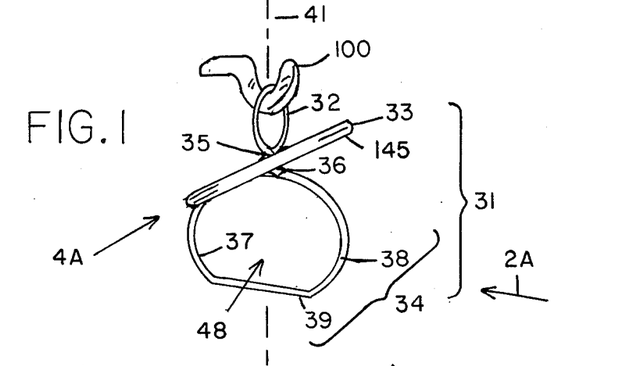
FIG. 1 is an oblique view of a carrier apparatus 31 from its top and left side.
Figure 4:
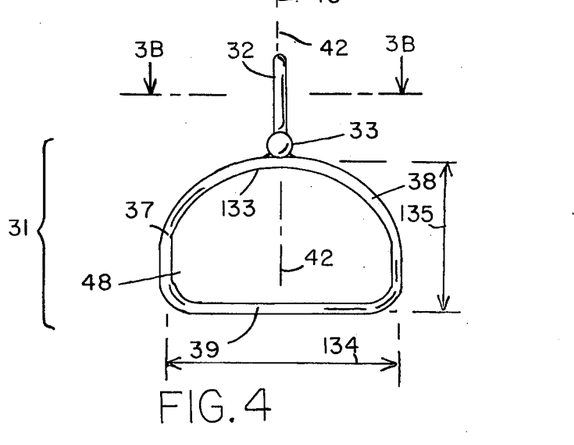
FIG. 4 is an end view of apparatus 31 along the direction of arrows 4A of FIG. 1 and 4B of FIG. 3.

The ring 31 is circular and of uniform diameter along the solid portion thereof as shown in FIG. 3. The orifice 47 of the ring 32 is circular. The orifice 48 of the lower loop 34 is symmetrical about the vertical axis 41 of the apparatus 31 and also is symmetrical about the plane 42 of the ring 32. The lower rigid loop 34 is formed of a rear and upper curved portion 37 and a front and upper curved portion 38 and a straight lower portion 39, all of which are rigid and firmly connected to each other as shown in FIGS. 1 and 4. The rear upper curved portion 37 and the front upper curved portion 38 of the loop 34 are firmly and smoothly joined to each other at the loop-bar junction 36 and the straight lower portion 39 of the lower rigid loop 34 is firmly connected at its rear end to the bottom of the rear curved portion 37 of the loop and is connected at its front end to the bottom of that front curved portion 38 of the lower rigid loop 34.

Accordingly the portions of the lower loop 34 extend in a plane 43 which is perpendicular to the flat plane 42 along which plane the bar 33 and the solid portions of the ring 32 extend. The plane 43 of the rigid lower loop 34 forms a plane of symmetry for the top rigid ring 32.

In the above description and in the following description the terms "left" and "right" are applied to the parts of the apparatus 31 with consistent reference to the left and right position of its parts relative to the operator 51 holding such apparatus as shown in FIGS. 6, 7, 10, 17, 22 and 23, the figures of the drawings showing a load being carried by the operator. The terms "front" and "rear" as applied to the apparatus 31 herein refer to the front and rear as shown in FIGS. 1, 3, 4, 14, and 23. Forward and rearward refer to the positions relative to the operator 51.

Figure 6:
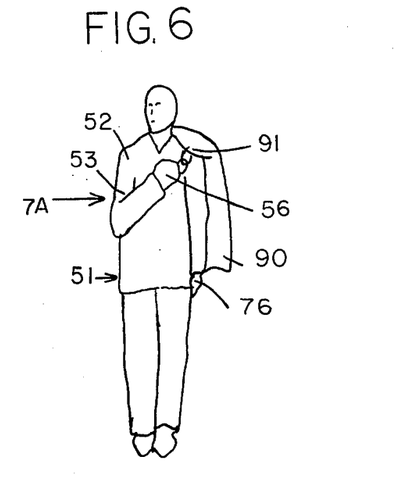
FIG. 6 is a front view of the operator 51 shown in FIG. 5 utilizing apparatus 31 to carry a load 90. This view is taken along the direction of the arrow 6A of FIG. 7.
Figure 7:
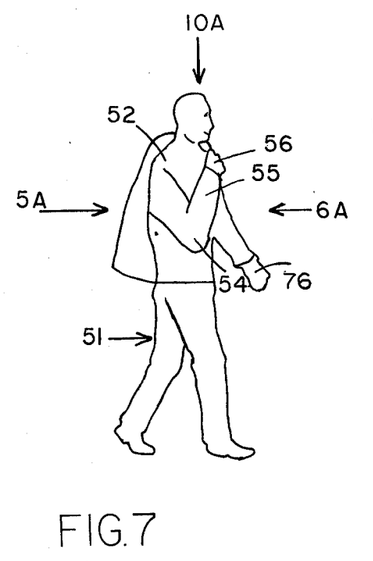
FIG. 7 is a side view of the operator 51 utilizing apparatus 31 to carry a load 90. This view is taken along the direction of the arrow 7A of FIGS. 5 and 6.

In a preferred embodiment of operation the operator 51 carries the apparatus 31 adjacent his left shoulder 72. In such preferred method of using the apparatus 31 in its load-carrying position the right upper arm 53 of the operator 51 is bent at the right elbow 54 and the right forearm 55 extends upwardly toward the left shoulder generally as shown in FIGS. 6 and 7. The operator's right hand, generally shown as 56, is then straight at its wrist portion, 57, (which wrist portion is also referred to as the metacarpal portion of the hand). The back, 58, of the right hand then faces inwardly and the bar 33 of the apparatus 31 is held in the palm, 59, of the operator's right hand while the fingers, 60, of the right hand, 56, extend around the intermediate rigid bar 33 of the apparatus 31. The loop 34 engages the hooks 91–93 of a load 90 of clothes.

Figure 8:
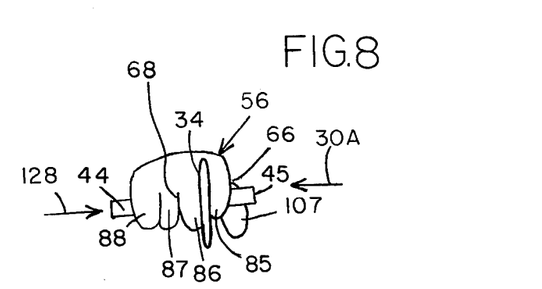
FIG. 8 is an enlarged view of the right hand 56 of the operator 51 when holding the apparatus 31 as in FIGS. 5-7 and as seen along the direction of arrow 8A of FIG. 10.
Figure 14:
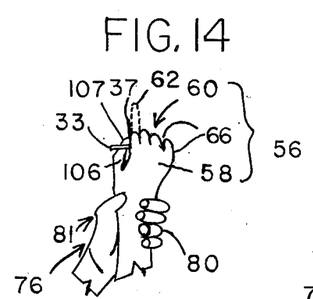
FIG. 14 is an enlarged top view of zone 14A of FIG. 11.

The operator's right thumb 61 is located, in the position of parts shown in FIGS. 5, 6, 7 and 8, below the intermediate rigid bar 33 while the index finger 62, the middle finger, 63, the ring finger, 64, and the little finger, 65, are each wrapped around the intermediate rigid bar 33 of the carrier apparatus 31. Preferably, during such carriage of the load 90 as in FIGS. 5–7 the loop 34 extends through the space 67 between the index finger 62 and the middle finger 63 of the right hand 56 as shown in FIGS. 8 and 14. Alternatively, the rigid loop 34 may extend through the space 66 between the thumb 61 and the index finger 62 as shown in FIG. 9 (which is the position apparatus of 31 when it is moved from load carrying position to load discharge position).

Conventional clothes hangers which support clothing hanging on such clothes hangers, and which clothing and hangers form the load 90, have conventional J-shaped hooks, as 91, 92 and 93, which hooks project upwardly from the body of the load 90, as shown in FIGS. 10, 16, 17 and 28.

Figure 5:
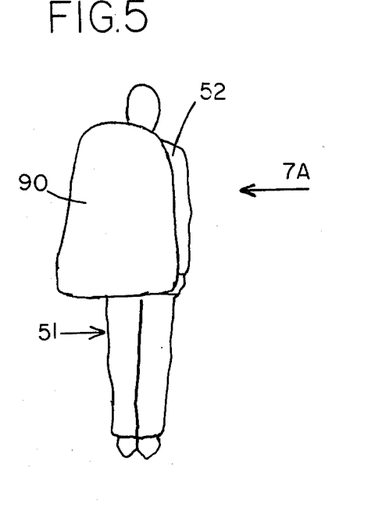
FIG. 5 is a rear view of an operator 51 utilizing one method of use of the carrier apparatus 31 to carry a load 90 with the apparatus 31 adjacent the operator's left shoulder. This view is taken along the direction of the arrow 5A of FIG. 7.

During the carrying position of FIGS. 5–7, the ends of the hooks 91, 92 and 93 of the clothes hangers extend through the orifice 48 of the lower rigid loop 34 and are supported on the forwardly located and front curved edge portion 37 thereof and on the rigid straight portion 39 of the loop 34. During such carrying position of the load 90 on the left shoulder of the operator the left upper arm 73, left elbow 74, left forearm 75 and the left hand 76 and its fingers 80 are free to open doors and otherwise operate without attention to the carriage of the load 90.

Figure 9:
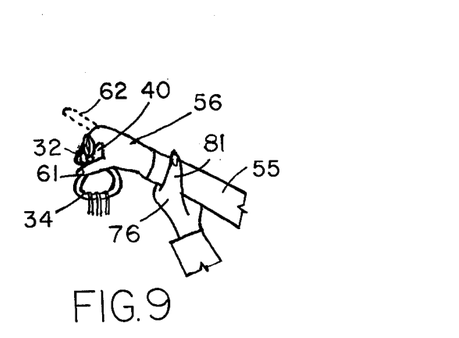
FIG. 9 is a left side view of the wrist and hand portions shown in zone 9A of FIG. 13.
Figure 10:
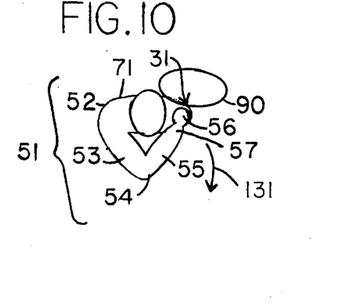
FIGS. 10, 11, 12 and 13 are a sequence of diagrammatic top views of an operator 51 in stages of moving the apparatus 31 and load 90 from the load-carrying position of operator and apparatus 31 shown in FIGS. 5, 6 and 7 to the load release position shown in FIGS. 13 and 16. These views are taken along the direction of arrow 10A of FIG. 7.
Figure 13:
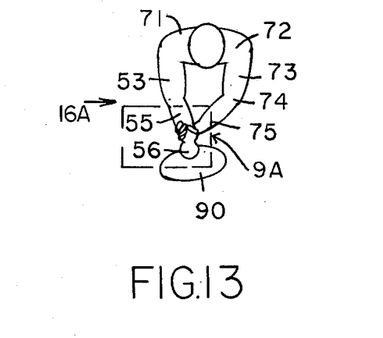

After utilizing the apparatus 31 to carry a load as 90 in the position as shown in FIGS. 5–7 with the loop 34 located in the interdigital space 67 between the right index finger 62 and the right middle finger 63 as shown in FIG. 8, preparatory to moving the hand 56 and apparatus 31 and load 90 from their position of FIG. 10 to the position of the hand, apparatus and load shown in FIG. 13 the operator's right index finger 62 is raised from its bent position shown in solid lines in FIG. 8 at left of loop 34 to the straightened or extended position of that finger as shown by dashed lines in FIGS. 9 and 14 and then returned to the bent position shown in FIGS. 9 and 14 on the right side of ring 32; thereby the loop 34 then extends through the interdigital space 66 between the right thumb 61 and right index finger, as shown in FIG. 9.

Figure 11:
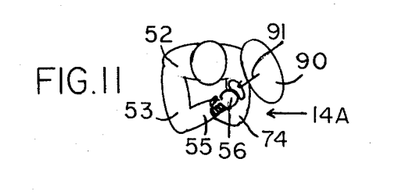
Figure 12:
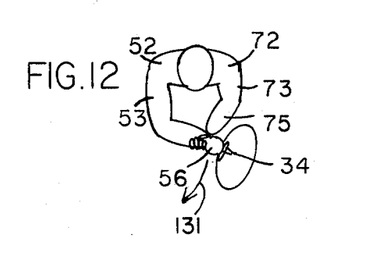
Figure 15:
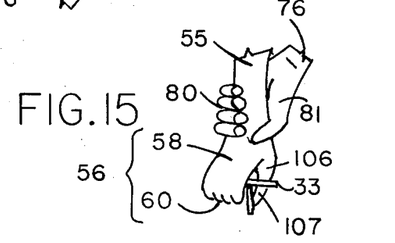
FIG. 15 is an enlarged top view of zone 9A of FIG. 13.

During movement of the load 90 from the back 71 and left shoulder 72 of the operator 51 to a point of support for the load 90, such as hook 100, the operator 51 grasps his right wrist 57 with the left thumb 81 and fingers 80 of the left hand 76 and thereby supports that wrist as shown in FIG. 14 while moving the right hand 56 forwardly from its position shown in FIG. 11 to its position shown in FIG. 12 and then to its position shown in FIG. 13. FIG. 15 shows the position of the left hand relative to right hand in zone 9A of FIG. 13 and shows the surface of the back 58 or (dorsum) of the right hand 56 facing upwardly.

Figure 16:
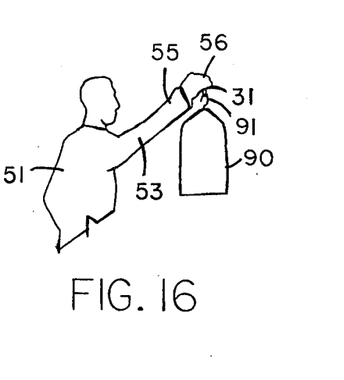
FIG. 16 is a side view taken along the direction of the arrow 16A of FIG. 13 to show the operator 51 in the stage of passing the load 90 from the apparatus 31 onto a hook support therefor.

The apparatus 31 provides that the hand 56 of the operator does not pronate or supinate during movement of that apparatus 31 and load 90 from their initial (or load-carrying) positions shown in FIGS. 6 and 7 and 10 to their final or load discharging position shown in FIGS. 13, 15 and 16. As shown in final FIG. 16 the operator 51 then positions the load 90 while such load 90 is suspended on the lower loop 34 of apparatus 31 so that that the upper ring 32 engages and is located on the hook 100; such positioning by the operator is effected by the operator's then holding and supporting and positioning of the bar 33 and ring 32 and loop 34.

Figure 20:
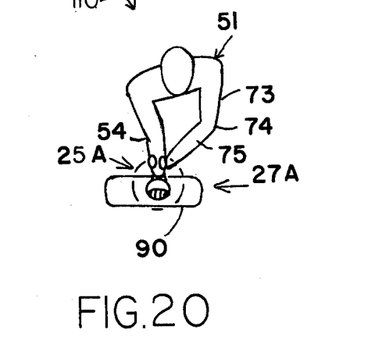
Figure 21:
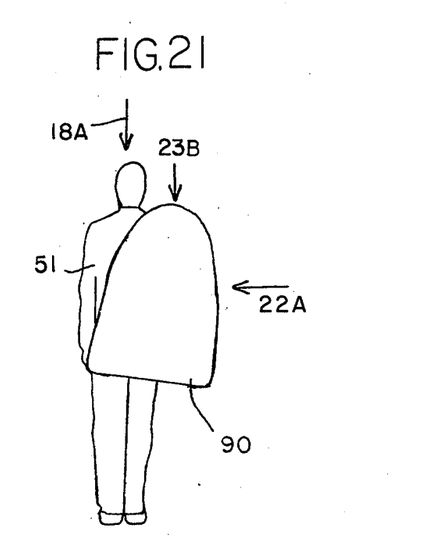
FIG. 21 is a rear view of an operator 90 in the stage of carrying a load 90 on the apparatus 31 located on his right shoulder 52. This view is taken along the direction of the arrow 21A of FIG. 22.
Figure 22:
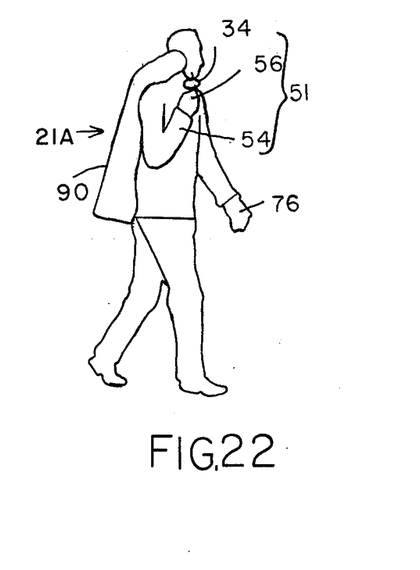
FIG. 22 is a side view taken along the direction of the arrow 22A of FIG. 21 of an operator 51 in the stage of carrying a load 90 via the apparatus 31 on his right shoulder.
Figures 23, 24, 25, 26, 27, 28:
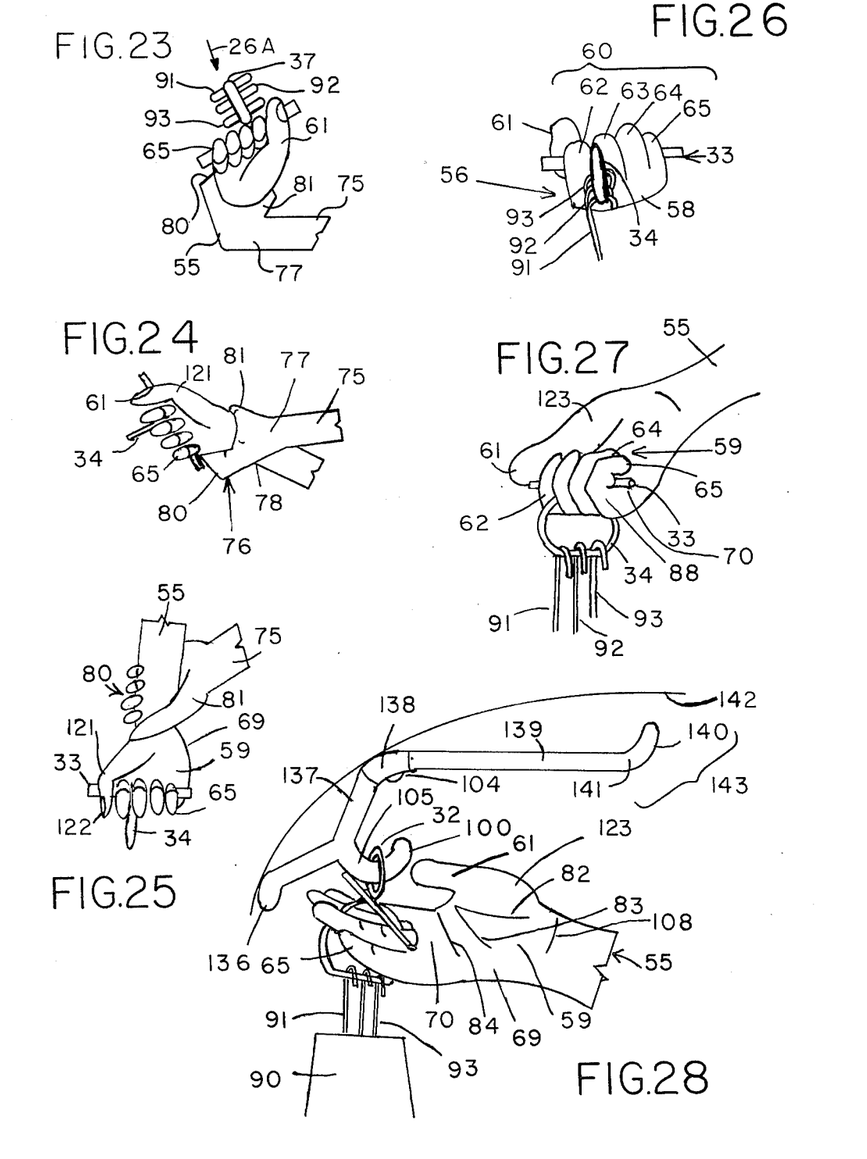
FIG. 23 is an enlarged top view of the hand 56 and apparatus 31 in their positions shown in zone 23A of FIG. 17.
FIG. 24 is an enlarged top view taken looking downward at the zone 24A of FIG. 18.
FIG. 25 is an enlarged top view of the zone 25A of FIG. 20.
FIG. 26 is an enlarged view of the apparatus 31 and of the end of the operator's hand as seen along the direction of arrow 26A of FIG. 23
FIG. 27 is an enlarged left side view of zone 25A of FIG. 20 looking along the direction of arrow 27A of FIG. 20.
FIG. 28 is a side and top oblique view which shows the apparatus 31 and a load 90 being transferred from the hand 56 of an operator to a hook 100.

In the operation as shown in FIGS. 17-28 where the operator 51 initially carries and supports the load 90 on his right shoulder 52 and his back 71 the position of the operator's right hand 56 is as shown in FIG. 26 with the back (or dorsum) 58 of the right hand 56 facing downwardly and the fingers 60 of the right hand 56 located upward of the palm 59 of the hand, as also shown in FIGS. 24 and 25. Details of the arm and hand positions in moving the load 90 from the load-carrying position shown in FIGS. 17 and 22 and 23 to the discharge position of FIG. 28 are shown in FIGS. 18-20 and 24-27. During and for carrying the load 90 on the operator's right shoulder 52 as shown in FIGS. 21 and 22 the operator's right hand 56 is located with its palm 59 facing upward as shown in FIGS. 23 and 26 and resting on or near to the operator's right shoulder.

Figure 17:
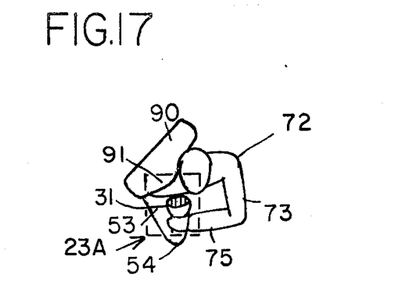
FIGS. 17, 18, 19 and 20 are a sequence of diagrammatic top views of an operator 51 in a stage of moving a load 90 from the carrying position of the apparatus 31 and load 90 shown in FIG. 22 to the position at which the operator is locating the load 90 and the apparatus 31 onto a hanger as shown in FIG. 28. These views are all taken along the direction of arrow 18A of FIG. 21.
Figure 18:
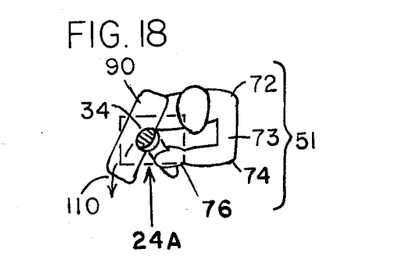
Figure 19:
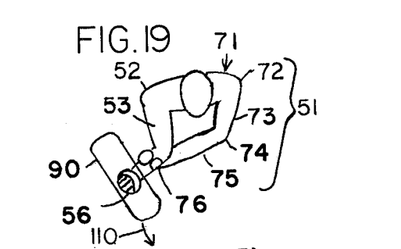

To move the load 90 and apparatus 31 to discharge the load and apparatus 31 onto a hook support as 100 from (a) the position, as in FIGS. 17 and 22, wherein the operator's right hand 56 holds the apparatus 31 as shown in FIGS. 21 and 22 to (b) the position of discharge or unloading of the apparatus 31 and load 90, the left hand 76 of the operator 51 is placed with the left wrist 77 bent and initially forward of the right wrist while the left thumb 81 and the fingers 80 grasp the palmar portion of the right wrist 57 as shown in FIG. 23. The operator 51 next moves the right hand 56 upwardly while holding the apparatus 31 (and thus also the load 90) while the left hand 76 bears upwardly upon and supports the right wrist 57 and hand 56. The operator's right hand 56 then bears upwardly on bar 33 to move the load 90 upwards and rightwards from the right shoulder as shown by the movement of the operator's arms and hands and apparatus 31 and load 90 from their position shown in FIG. 17 to their positions shown in FIG. 18. The operator then continues to move his arms, forearms and hands to move the apparatus 31 and load 90 supported thereon in the generally circular path 110; the left hand 76 then firmly holds the positively supports the right wrist as shown in FIGS. 19, 20, 24 and 25 until the operator 51 has brought his right hand 56 to a position adjacent the hook 100 onto which the ring 32 is to be attached. At that time, as shown in FIG. 28, the operator exposes the orifice 47 of the upper rigid ring 32 to the extending point 101 of the hook and the orifice 47 of ring 32 is moved onto the hook while the right palm 59 with fingers 60 extended supports the bar 33 of apparatus 31.

Figure 29:
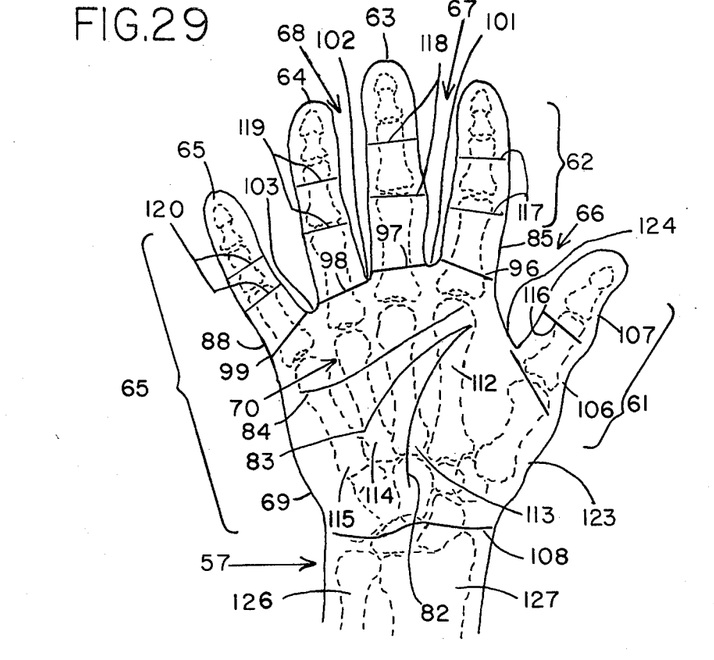
FIG. 29 is a diagrammatic scale view of the volar or palmar surface of the human hand showing the positions of the major skin creases or furrows and the skin surfaces therebetween relative to the bones and joints between the bones (shown in dash lines) in the hand and fingers about which joint flexure occurs.

As background for description of the location of the bar 33 when held by the operator's hand 65 reference is made to FIGS. 28 and 29. FIG. 29 shows in dashed line the radius bone (127) and the ulna bone (126) which respectively indicate the radial and ulnar sides of the hand 65. The skin of the hand is tied down to the bones by fibrous bands along the lines of flexion of the digits and provides permanently visible lines or creases or furrows as 82, 83 and 84 in that skin. One of these furrows or creases, 82, starts in front of the center of the wrist (at the tuberosity of the navicular bone) and curves around the base of the thumb (the thenar eminence) 123 and ends on the radial border of the hand between thumb and index finger (a little above the metacarpophalangeal joint of the index finger). A second skin line or furrow or crease, 83, begins at the radial end of the first line or crease or furrow 82 and extends obliquely across the palm to reach the ulnar border 69 of the hand at a point between the base of the little finger and the wrist crease or furrow 108 (i.e. such point is at about the middle of the fifth metacarpal bone). A third skin line, the distal crease, 84, begins at the ulnar border, 69, of the hand about 2.5 centimeters distal to the end of the second crease 83 and extends across the heads of the fifth, fourth and third metacarpal bones of the hand (115, 114, and 113 respectively). The proximal segments 85, 86, 87, and 88 of the fingers 62, 63, 64 and 65, respectively, are joined to one another on the volar aspect of the hand by folds of skin 101, 102, 103, respectively, constituting the webs of the fingers. These folds extend across the spaces between the proximal phalanges as 85, 86, 87 and 88 of the fingers 62, 63, 64 and 65 respectively at about the level of the centers of the proximal phalanges of those fingers; the free margins of those folds are continuous with the transverse furrows 96, 97, 98 and 99, respectively, at the roots of the fingers 62, 63, 64 and 65 respectively. A pad 70 of skin and flesh is located between (a) the transverse furrows 96-99 at the roots of the fingers 62-65 respectively and (b) the third or distal skin crease 84. Over the fingers and thumb the skin is crossed by transverse furrows 116-120, with pads of skin between such furrows.

The bar 33 is of sufficient strength, length, rigidity and diameter and has a smooth curved exterior surface so that when it is held against the palm of the operator's right hand as in FIGS. 8 or 26 or positioned or located in contact with or against the proximal segments of the fingers, as in FIGS. 9 and 28 it has a sufficiently large surface area and length and dimensional stability so that the full strength of the right and left forearms supporting the right hand is applicable against that bar 33 to support the apparatus 31 and any load, as 90, supported by such apparatus 31.

The surface of the bar 33 is sufficiently smooth to allow smooth gliding movement of the bar along the length of area of contact of that bar and the skin surface of the pad 70. To allow such movement the surface of the bar 33 may be entirely smooth or lightly burnished to permit such movement in the direction 128. The movement along the direction 128 may be effected by lightly pushing on the bar or load with the left hand while the finger 62 is raised or the grip of the operator on the bar may be slightly loosened while the finger 62 is raised as shown in dotted lines in FIGS. 9 and 14. As particularly shown in FIG. 30, loop 34 is short enough across its major diameter 134 to allow the index finger 62 to pass over it in the position shown in FIGS. 9 and 14 for movement of the loop 34 and apparatus 31 from the position thereof shown in FIG. 8 to the position thereof shown in solid lines in FIG. 9, yet portion 34 is long enough, e.g. 1½ inches (3.8 cm), to accommodate several (3-6) hooks, as 91-93, of hangers, even in view of the usual thickness of the clothes supported by such hangers and the spacing apart of the hooks of those hangers at the top of such body of clothes. The minor diameter 135 of the loop 34 (top to bottom in FIG. 4) is long enough to keep the hangers spaced away from the fingers of the operator yet is short enough to provide leverage and control, through the bar 33, by the operator's hand so that the operator has comfortable control of the position of the straight portion 39 of such loop.

Figure 30:
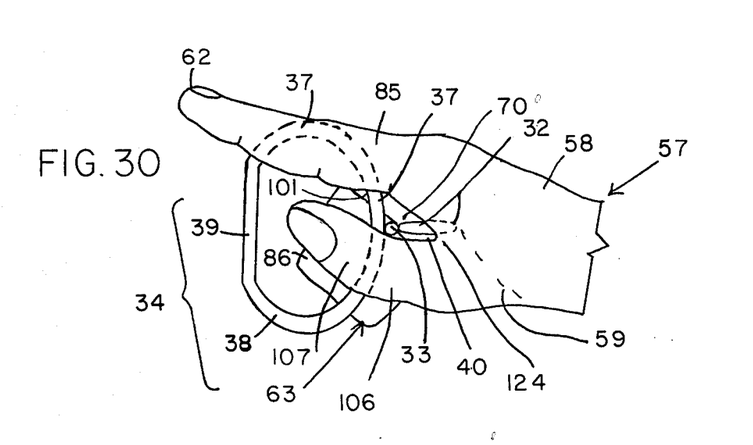
FIG. 30 is a side view of the apparatus 31 and operator's hand 65 as seen along the direction of arrow 30A of FIG. 8 when the index finger 62 is partially raised and extended from the position shown in FIG. 8. This figure illustrates the relation of the bar 33 and ring 32 to the palmar hand portion 70 and to expose the space 40 at a position of hand portions of apparatus 31 when the operator's index finger 62 is only partially raised and is located between (a) the position of the operator's clenched hand 56 and apparatus 1 shown in FIG. 8 and (b) the position of operator's hand 56 and apparatus 31 shown in FIGS. 9 and 14 where the operator's finger 62 is fully raised and extended as shown in dotted lines.

As shown in FIG. 30, ring 32 has an external diameter that is small enough to fit into the cavity 40 of the clenched hand and also slide between the index finger and thumb past the fold of skin 124 between the thumb 61 and the index finger 62, yet ring 32 is large enough in view of the needed thickness of such ring for adequate strength to support a 100 lb. load, to readily fit over a hook as 100 that is large enough and strong enough to support a load of clothes or the like that weighs 100 pounds (45.5 kg).

The dimensions of the particular preferred embodiment below set out in Table 1 are directed to a size of apparatus 31 particularly adapted to fit a normal male hand of 7 to 8 inches (17.8-20.4 cm) length from wrist forearm or crease 108 to distal tip of the middle finger 63. However, correspondingly smaller sizes of apparatus 31, yet in the same proportions, may be used for persons with smaller hands.

During the position of the hand and parts of apparatus 31 shown in FIG. 9, the thumb and index finger firmly bear on the front curved portion 37 of the lower rigid loop 34 and the thenar eminence 123 or base of the thumb bears on the rear curved portion 38 of the rigid loop 34 and the proximal phalange or segment 106 of the thumb 61 firmly bears on one side 144 of the bar 33 while the pad 70 of the palm bears on the other side 145 of bar 33 and serve to firmly guide the ring 32 relative to the hook as 100 on which the apparatus 31 and 90 are to be supported. The rigidity of the bar 33 and ring 32, which are then firmly held by the operator's hand, and the rigidity of their connection to the loop 34 provides for the operator's control of the position of the load held on the loop 34. The rigidity of positioning of the loop 34 on the bar 33, which are also held firmly by the operator's hand 65 as above described, also provides for positive positioning of the ring 32 in the position shown in FIG. 9. In the positions of FIGS. 8 and 26, the rigid attachment of the bar 33 to the lower loop 34 and the rigidity of the lower loop 34 provide that the loop 34 is readily manipulated by the hand of the operator 51 by his manipulation of the bar 33. Also, the rigid attachment of the bar 33 to the upper ring 32 provides that such ring is readily manipulated by the hand of the operator 51 by his manipulation of the bar 33 in position of FIG. 9.

The straight portion 39 of the rigid loop 34 allows a plurality of hooks as 91-93 to spread out from each other along that portion 39 and reduces the wrinkling of clothes arrayed in a group and otherwise pressed against each other during movement of one of such groups of clothing relative to another of such group.

During manipulation of the load 90 as shown in FIGS. 10-13 the right forearm 55 rotates in a curved forwardly extending path 131 about the right elbow 54 and right shoulder 52 and there is then no pronation or supination of the right hand 56 (relative to the right elbow). During the movement from the position of FIG. 10 to the position of FIG. 13 there is rotation of the left hand 76 relative to the left forearm 75, as shown in FIGS. 11-13, and also there is then supination of the left hand.

During manipulation of the load 90 and movement along path 110 as shown in FIGS. 17-20 the right hand rotates and also supinates relative to the right elbow during movement from the right hand position shown in FIG. 17 to the right hand position in FIG. 20 and the left hand 75 then moves from a pronated to a supinated orientation and rotates about the left elbow 74.

The apparatus 31 is, as above described, particularly adapted to utilize the facts that (1) there are spaces as 66 and 67 between the fingers through which the rigid loop 34 may project, and (2) in the position of FIGS. 8 and 26 there is a skin pad portion 70 that extends proximally or wristward of the interdigital spaces as 66 and 67 and distally of the point of flexure of the bones of the fingers as 85, 86, 87 and 88 relative to the bones of the hand as 112-115, and (3) there is a space, 40, between the skin of the palm and the palmar surface of the fingers in a clenched fist. The apparatus 31 provides that the thickness of the bar of which loop 34 is formed is sufficiently small to fit through the interdigital spaces as 66 and 67 so that loop 34 comfortably extends through and between the small but definite interdigital space for purpose of engaging and supporting the hooks as 91-93 of the hangers. At the same time the bar 33 engages the pad portion 70 of the palm skin that extends distally of the wrist past the points of flexure of the joints whereat the first or central or proximal bases or phalanges 85-88 of the fingers join the carpal bones as 112-115 of the hand. Such pad portion 70 of the palm extends from the space 66 between the thumb and index finger to the ulnar (small finger) edge 69 of the palm and thereby provides a continuous area of support and contact for the bar 33. In the position of elements of the operator's hand and the components of apparatus 31, because of the orientation of the planes 42 and 43 of the apparatus 31 the upper ring 32 fits into the space 40 between the palm of the hand and the palmar surface of the fingers even though the fingers are in an orientation usually described as clenched.

Accordingly, during the load-carrying position of apparatus 31 and load 90 as in FIGS. 6, 7, 8, 21, 22 and 26, the bar 33 rests on and against the pad 70, which pad is then in compressed condition because of flexure of the phalanges about the joints connecting those phalanges to the bones of the hand. The load 90 is accordingly borne through the apparatus 31 all along the length of contact of such pad 70 and bar 33 rather than that the weight of such load is applied to a limited portion of the surface of one or two fingers as is usual when clothes hangers are attempted to be carried without the apparatus 31.

While carrying the load 90 on the left shoulder as in FIGS. 6 and 7 the portion of the load adjacent the hangers extends downward and forward from the front of the left shoulder so that the loop 34 urges the hangers rightward and downward and rearward to prevent the top of the load from moving upward and leftward and forward and the bar 33 is then pressed against the skin pad 70 of the palm of the operator's hand 56, which pad is distal to distal crease 84.

The outside diameter of the upper ring 32 is sufficiently small so that such ring may (a) pass under the base of the index finger as 62 when it is raised, as shown in dotted line in FIGS. 9 and 14 so that the position of the index finger may be then shifted from leftward of the loop 34 as shown in FIG. 8 to a position rightward of the rigid loop as shown in FIGS. 9 and 15, and (b) be held between the palmar surfaces of the fingers and the palm as shown in FIGS. 8, 26, and 30. Nevertheless, the loop 32 is sufficiently large so that it may encircle so easily as to not require too accurate a manipulation to encircle a hook as 100 which has sufficient size to have sufficient strength to support a load 90 that weighs about 100 pounds (45.5 kg).

While the operation and dimensions above given refer to a preferred embodiment of the invention, the invention is not limited to apparatus of such particular shape or dimensions. For instance, the side or arm 145 of the bar 33 may be made longer than the side or arm 144 and the entire apparatus 31 may be made larger for people with larger hands and may be made smaller for people with smaller hands. Also, the outline or shape of the lower loop 34 should be curved to avoid snagging or catching on clothing of an operator, but need not be of uniform radius of curvature and the upper loop 32 is, broadly, of a size small enough externally to fit into the palm of the hand yet be large enough internally to encircle a conventional hook to hold a load as 90 and rounded to not gouge the hand of the operator.

The above description of the movement as in FIGS. 10–13 of the apparatus 31 and load 90 carried thereon from the load carrying position on operator's back and left shoulder as shown in FIGS. 5–7, to hook 100, and the movement as in FIGS. 17–20 from the load carrying position of FIGS. 21–23 to the hook 100 may be reversed for movement of the load 90 supported on the apparatus 31 to the load-carrying position on the operator's back and left shoulder or back and right shoulder.

The hook 100 for engagement by the ring 32 is for use in an automobile or similar vehicle and is preferably a part of a hook support assembly 143 which assembly is supported on and adjacent to the interior car roof 142. The hook support assembly 143 comprises (a) a lower foot portion 136; (b) an intermediate base portion 137; (c) an upper horizontally extending hook portion 139 with an upper terminal hook 140 with a curved portion 141; and (d) a lower support hook 100 connected to the base portion 137 by a curved portion 105. A collar 138 engages a fastener 104 that extends between the roof 142 and the collar; the collar is firmly attached to portions 137 and 139. The foot portion 136 rests on the interior of the car roof. All portions 136–141, 104 and 105 of the hook assembly 143 are firmly and rigidly joined together and are formed of rigid steel.

In the preferred embodiment of apparatus 31, the solid stock of which the ring 32 and loop 34 and bar 33 are made is an abrasion-resistant, smooth surfaced, formable yet rigid non tarnishing, high tensile strength cylindrical rod, such as ¼ hard austenitic type 302 stainless steel. Such material has a hardness in range of B-80 to C-35 on the Rockwell scale and has a yield strength of 50,000 to 140,000 psi and has a tensile strength of 100,000–160,000 psi.

In a preferred embodiment of assembly 143, arm 139 is ¼ inch (6 mm.) thick measured top to bottom in FIG. 28, and ¼ inch (6 mm.) wide measured to transverse to the width and length of arm 139, such length measured from left to right in FIG. 28. Foot 136, base 137, and hook 140 are likewise ¼ inch (6 mm.) wide and ¼ inch (6 mm.) thick. Collar 143 is ¾ inch (19 mm) wide, ¼ inch (6 mm) thick and ½ inch (12.5 mm) long and has a single central hole 3/16 inch (4.8 mm) in diameter.

The loop 34 may have a straight portion at position 133 in FIG. 1 adjacent the bar 33 and between curved portions 37 and 38 as set out in Table I and such straight portion would have the same length as flat portion 39. Alternatively, as shown in FIG. 1, the loop 34 has an upwardly convex portion tangential to and adjacent bar 33 with an upper radius of curvature ½ of the major diameter 134 of the loop 134 and a smaller exterior radius of curvature, about ¼ inch, adjacent portion 39.

TABLE I

| Dimension of Apparatus 31 and Assembly 143 | | Inch | cm. |
|---|---|---|---|
| Apparatus 31 | | | |
| Loop 34 | major outer diameter (134) | 3⅛ | 7.87 |
| | minor outer diameter (135) | 2 | 5.1 |
| | radius of outer curvature of portions 37 and 38 | 1 | 2.54 |
| | flat portion (139) Length | 1½ | 3.8 |
| | thickness of loop stock | ⅛ | .32 |
| Bar 33 | diameter | ¼ | .64 |
| | length | 4 | 10.2 |
| Loop 32 | outside diameter | 1 | 2.5 |
| | thickness of ring stock | ⅛ | 0.32 |
| Hook assembly 143 | | | |
| Bottom of 141 to top of hook 140 measured vertically | | 0.65 | 1.65 |
| Left edge of portion 137 right to tip of hook 140 measured horizontally | | 3 5/16 | 7.9 |
| Top of arm 139 to bottom of 105 measured vertically | | 1½ | 3.8 |
| Left edge of 137 to right tip of 100 | | 0.95 | 2.4 |
| Left edge of 137 to left edge of foot 136 | | .45 | 1.1 |

I claim:
1. A carrier apparatus comprising:
   a rigid loop, a rigid ring and a straight bar,
   said rigid loop having a major diameter and a minor diameter, said major diameter being larger than the minor diameter, said ring having a maximum diameter, said minor diameter of said loop being larger than the maximum diameter of said ring,
   the rigid loop extending along a first plane and the ring extending in a second plane transverse to the first plane, and the bar extending between said rigid loop and said ring along the second plane and extending tangentially to the ring and being rigidly joined to the loop and to the ring.
2. Apparatus as in claim 1 wherein said ring is formed with an exterior smooth surface and said bar has an exterior smooth surface, and said bar extends along a straight line from one end of said bar to the other end of said bar.

3. Apparatus as in claim 1 wherein the first and second planes intersect at a line along which a surface of said bar is tangential to said ring and a surface of said bar is tangential to said loop.

4. Apparatus as in claim 3 wherein said bar extends transversely to said line along which said first and second planes intersect.

5. Apparatus as in claim 4 wherein said ring has a smooth surfaced exterior and said bar has a smooth surfaced exterior and said loop has a smooth surfaced exterior adjacent to said bar.

6. Apparatus as in claim 5 wherein said loop comprises two outwardly convex curved portions and an intermediate straight portion, and one of said outwardly convex curved portions is located on one side of said second plane and a second outwardly convex portion is located on an opposite side of said second plane and said intermediate straight portion extends between said curved portions of said loop and is spaced away from said bar.

7. Apparatus as in claim 6 wherein said loop and said ring are each symmetrical about said line at which said first and second planes intersect.

8. Apparatus as in claim 7 wherein said loop has a major diameter of 3 inches and a minor diameter of 2 inches transverse to the major diameter and the ring has an outside diameter of 1 inch.

9. Apparatus as in claim 5 wherein, for an operator's hand that is 7 inches from the wrist crease to the tip of the middle finger, said loop has a major diameter of 3 inches and a minor diameter of 2 inches transverse to the major diameter and the ring is an anchor ring and said major and minor diameters of said loop and the diameter of said ring are proportionately larger for larger hands of operators and proportionately smaller for smaller hands of operators.

10. Apparatus as in claim 5 wherein said loop is adapted to extend through the interdigital space between the index and middle finger of an operator's clenched hand while the ring is located between the fingers and the palm of the operator's clenched hand and said bar engages a pad of skin on the palm of the operator's hand, said pad located between the distal crease of said palm and furrows at the roots of said operator's fingers.

11. In a process of a human operator transporting a load of garments supported by hanger supports, which supports extend from the top of said load, the steps of supporting said load in part on the back and in part on a shoulder of said operator and while holding said hanger supports by a rigid loop, one portion of which rigid loop extends in a first plane, and said first plane and said loop pass through an interdigital space between the fingers of the hand of said operator while said loop is rigidly held by a rigid bar positioned against a pad of skin on the palm of the operator's hand which pad is located between the distal crease of the palm and the furrows at the roots of the fingers of the hand of said operator, and which bar extends from the radial to the ulnar border of the palm of the operator while said bar is held within a space between the fingers and the palm of the clenched hand of the operator, and also including the step of moving said load between a load-carrying position by said operator and a support hook for said load of garments while controlling the position of said load by a rigid support ring means rigidly attached to said bar and held between the fingers and palm of said operator's hand, said process comprising the steps of
(a) said operator moving said support ring means to a space between the thumb and index finger of the operator and
(b) said operator then holding said bar and loop and support ring means with said bar between the palm and the fingers of said operator's clenched hand and said support ring means and said loop between the thumb and index finger of said operator's clenched hand and moving said bar and loop and rigid support ring means with a load of garments supported on said loop while said support ring means extends transversely to said first plane.

12. Process as in claim 11 including the step of moving said support means into operative engagement with a hook support and depositing said rigid support ring means onto said hook support with said loop attached to said bar and said load attached to said loop.

13. Process as in claim 11 including the step of removing said load support ring means from said hook support and moving said bar and said loop which loop is attached to said bar and said load which is attached to said loop together from said hook support.

* * * * *